(12) United States Patent
Kehrer (10) Patent No.: US 10,201,799 B2
(45) Date of Patent: Feb. 12, 2019

(54) PACKING ELEMENT FOR A STRUCTURED PACKING WITH SPECIFIC MOUNTING CLIPS

(71) Applicant: Sulzer Chemtech AG, Winterthur (CH)

(72) Inventor: Florian Kehrer, Effretikon (CH)

(73) Assignee: Sulzer Chemtech AG, Winterthur (CH)

( * ) Notice: Subject to any disclaimer, the term of this patent is extended or adjusted under 35 U.S.C. 154(b) by 292 days.

(21) Appl. No.: 15/216,110

(22) Filed: Jul. 21, 2016

(65) Prior Publication Data
US 2017/0050168 A1 Feb. 23, 2017

(30) Foreign Application Priority Data
Aug. 20, 2015 (EP) .................................. 15181827

(51) Int. Cl.
 *B01J 19/32* (2006.01)
 *B32B 3/28* (2006.01)
 *B32B 7/08* (2006.01)

(52) U.S. Cl.
 CPC .............. *B01J 19/325* (2013.01); *B01J 19/32* (2013.01); *B32B 3/28* (2013.01); *B32B 7/08* (2013.01);
 (Continued)

(58) Field of Classification Search
 CPC .. B01J 19/325; B01J 19/32; B01J 2219/3221; B01J 2219/3222; B01J 2219/32227;
 (Continued)

(56) References Cited

U.S. PATENT DOCUMENTS 1,477,894 A * 12/1923 Perry ........................ C02F 3/10
 210/151
2,470,652 A * 5/1949 Scofield ................. B01D 3/008
 261/100
(Continued)

FOREIGN PATENT DOCUMENTS

EP 1477224 A1 11/2004
GB 791967 A 3/1958
(Continued)

*Primary Examiner* — Charles S Bushey
(74) *Attorney, Agent, or Firm* — Larson & Anderson, LLC (57) ABSTRACT

The present invention relates to a packing element for a structured packing including at least two adjacent corrugated sheets, wherein each of the corrugated sheets has a plurality of alternately oriented peaks and troughs, wherein adjacent corrugated sheets are oriented such that the corrugations of the adjacent corrugated sheets intersect in crisscross fashion with the corrugations of the corrugated sheets extending obliquely relative to the vertical direction, wherein each corrugated sheet contacts each of the adjacent corrugated sheets at points of intersection between the corrugations of the corrugated sheet and those of the adjacent corrugated sheets, wherein all corrugated sheets are tied together by means of at least one rod, wherein the at least one rod penetrates the corrugated sheets perpendicularly to the longitudinal section of the corrugated sheets, wherein on the at least one rod before the first corrugated sheet of the packing element and/or after the last corrugated sheet of the packing element at least one mounting clip is provided for fixing the corrugated sheets on the rod, wherein the mounting clip has a central part forming a coupling portion for coupling the mounting clip to the rod and two opposing lateral parts forming a clamping portion for a clamping engagement with the corrugated sheet, wherein the lateral parts are connected (Continued)

with the central part and angled with respect to the central part.

19 Claims, 4 Drawing Sheets

(52) U.S. Cl.
CPC .......................... *B01J 2219/3221* (2013.01); *B01J 2219/3222* (2013.01); *B01J 2219/32227* (2013.01); *B01J 2219/32255* (2013.01); *B01J 2219/32265* (2013.01); *B01J 2219/32275* (2013.01); *B01J 2219/32282* (2013.01); *B01J 2219/32408* (2013.01)

(58) Field of Classification Search
CPC .... B01J 2219/32255; B01J 2219/32265; B01J 2219/32275; B01J 2219/32282; B01J 2219/32408; B32B 3/28; B32B 7/08
USPC .......................................... 261/112.2, DIG. 72
See application file for complete search history.

(56) References Cited

U.S. PATENT DOCUMENTS

| | | | |
|---|---|---|---|
| 2,748,727 A | 6/1956 | Plummer et al. | |
| 2,793,017 A | 5/1957 | Lake | |
| 3,460,860 A | 8/1969 | Stevens, Jr. | |
| 3,540,702 A * | 11/1970 | Uyama | B01J 19/32 261/112.2 |
| 3,687,818 A * | 8/1972 | Porter et al. | B01J 19/32 202/158 |
| 3,998,002 A | 12/1976 | Nathanson | |
| 4,052,491 A | 10/1977 | Lefevre | |
| 4,499,031 A * | 2/1985 | Sexton | B01F 3/04085 236/44 C |
| 4,512,938 A * | 4/1985 | Jones | B01J 19/32 261/112.2 |
| 4,762,650 A * | 8/1988 | Bosman | F28C 1/06 261/100 |
| 5,388,316 A * | 2/1995 | MacLaren | B01J 19/32 269/47 |
| 6,206,349 B1 | 3/2001 | Parten | |
| 6,517,058 B1 * | 2/2003 | Engh | F28F 25/087 261/112.1 |
| 2003/0190461 A1 | 10/2003 | McKeigue et al. | |
| 2010/0237519 A1 | 9/2010 | Ausner et al. | |
| 2012/0096766 A1 * | 4/2012 | Bosch | A01G 9/02 47/33 |
| 2012/0160102 A1 | 6/2012 | Wicki et al. | |

FOREIGN PATENT DOCUMENTS

| | | |
|---|---|---|
| GB | 1245938 A | 9/1971 |
| GB | 2093967 A | 9/1982 |
| WO | 2010/033653 A2 | 3/2010 |
| WO | 2010106119 A1 | 9/2010 |

* cited by examiner

PACKING ELEMENT FOR A STRUCTURED PACKING WITH SPECIFIC MOUNTING CLIPS

The present invention relates to a packing element for a structured packing including at least two adjacent corrugated sheets including specific mounting clips for fixing the corrugated sheets together as well as to such mounting clips.

Structured packings are used as installations in mass transfer apparatuses, such as for example in distillation columns or in absorption columns. They serve for the improvement of the mass transfer and heat transfer between gases and liquids, in particular in applications in which the liquid load is low and/or the surface tension of the liquid is high.

Usually, structured packings are assembled from a plurality of packing elements, each of which being made in a commercial embodiment as a plurality of corrugated metal sheets arranged one after the other. Typically, the corrugated metal sheets are fixed with each other by means of several rods penetrating the corrugated sheets perpendicular to the longitudinal section of the corrugated sheets, wherein the rods are fixed with the first and last corrugated sheet by means of a washer and a nut. Each corrugated sheet comprises a plurality of alternately oriented peaks and troughs, wherein adjacent corrugated sheets are oriented such that the corrugations of the adjacent corrugated sheets intersect in crisscross fashion with the corrugations of the corrugated sheets extending obliquely relative to the vertical direction, thus forming inclined channels which continuously cross one another. These channels positively influence the flows of the gas phase and of the liquid phase within the packing and facilitate the mass transfer between the phases. That is, the gas phase and liquid phase are brought into contact in the channels of the packing and the mass transfer as well as the heat transfer between the phases is thus facilitated. More specifically, ascending gas comes into contact with liquid, which is present on the surface of the channels, when it flows downwardly through the mass transfer apparatus. During this contact, a component enriched in the gas can transfer into the liquid or vice versa; this means that an efficient mass transfer can take place. The amount of mass transfer per unit time is proportional to the boundary surface of the gas and of the liquid, wherein the boundary surface is larger the larger the proportion of the surface of the packing is which is wetted by the liquid. Such packings are described for example in U.S. Pat. No. 6,206,349 B1.

In order to increase the mass transfer, i.e. the separating efficiency of a structured packing, the surface of the structured packing is usually increased, which is usually achieved by a higher number of layers, by tighter channel geometries and/or by providing more cross-channels. The contrary, namely decreasing the surface of the structured packing, decreasing the number of layers and selecting less or larger channels leads to a reduced mass transfer, but to an increased capacity of the packing. Due to the increased capacity, the packing can be operated in the aforementioned case at higher flow rates before the packing starts to get flooded. Another method of increasing the capacity—and thus decreasing the mass transfer—is the modification of the angle of inclination of the cross-channels. A small angle of inclination with respect to the vertical direction or main direction of flow, respectively, means a high capacity but small mass transfer, whereas a large angle of up to 45° means a better mass transfer particularly in distillation applications but worse capacity. The angle of inclination of the cross-channels also influences the number of points of intersection or contact points, respectively, between adjacent corrugated sheets. Apart from that, the number of points of intersection between adjacent corrugated sheets depends on the height of the packing element and the dimensions of the cross-channels. The number of points of intersection contribute to the mechanical stability of the packing element, because the mechanical stability of the packing element is higher the higher the number of points of intersection. On the other hand, the number of points of intersection has an impact on fouling or coking of the packing element during its operation. It is therefore desirable to minimize the number of contact points to provide higher resistance against fouling or coking. It is known that fouling and coking preferably occur at places of the structured packing, where the liquid is stagnant and not refreshed and/or washed away by more liquid during the operation of the structured packing, i.e. primarily at the points of intersection between adjacent corrugated sheets of the structured packing. At these points of intersection, rounded edges of the peaks of a corrugated sheet touch rounded edges of the troughs of an adjacent corrugated sheet tangentially and liquid is kept at these places due to capillary forces.

In order to solve such problems in view of fouling and of coking, it has been already proposed to decrease the number of points of intersections between adjacent corrugated sheets of a structured packing e.g. by decreasing the angle between the vertical direction and the corrugations of each structured packing. Apart from reducing the fouling and coking during the operation of such a structured packing, this measurement also leads to a decreased pressure drop during the operation of the structured packing. However, the decrement of the number of points of intersections between adjacent corrugated sheets of a structured packing reduces the mechanical stability of the structured packing. This is due to the fact that the reduction of the number of points of intersection between adjacent corrugated sheets of a structured packing results in that the single corrugated sheets of the structured packing become flabby, even in the case that the corrugated sheets are tied harder together with rods and nuts, because adjacent corrugated sheets touch only at a comparably low number of points. This also increases the danger that single packing elements of the structured packing loose individual corrugated sheets, because, when exposed to extreme mechanical challenges, like rude handling, transportation and vibration, in particular the first or last corrugated sheet of such a packing element may fall off.

This danger is particularly high for packing elements comprising comparable thick corrugated sheets and low surface area, as they are necessary especially for applications, in which the structured packings are exposed to severe conditions, such as solid soiling, erosion, corrosion, fouling, coking, vibration and others. Such comparable thick corrugated sheets cannot be drilled, why they have to be provided with comparable large slits in order to allow mounting them onto the rods. Due to these large slits, such comparably thick corrugated sheets fall particularly easy off the packing element.

In view of this, the object underlying the present invention is to provide a packing element for a structured packing including at least two adjacent corrugated sheets, wherein the corrugated sheets of the packing element are tightly fixed to rods so as to increase their mechanical stability, wherein it is avoided that the corrugated sheets are flabby, and, in particular, wherein it is avoided that the first and last corrugated sheets fall off the packing element, when exposed to extreme mechanical challenges, like rude handling, transportation and vibration, in particular in the case that the corrugated sheets of the packing element are comparably thick and in the case that adjacent corrugated sheets of the packing element have only a comparable small number of points of intersection.

In accordance with the present invention, this object is satisfied by providing a packing element for a structured packing including at least two adjacent corrugated sheets, wherein each of the corrugated sheets comprises a plurality of alternately oriented peaks and troughs, wherein adjacent corrugated sheets are oriented such that the corrugations of the adjacent corrugated sheets intersect in crisscross fashion with the corrugations of the corrugated sheets extending obliquely relative to the vertical direction, wherein each corrugated sheet contacts each of the adjacent corrugated sheets at points of intersection between the corrugations of the corrugated sheet and those of the adjacent corrugated sheets, wherein all corrugated sheets are tied together by means of at least one rod, wherein the at least one rod penetrates the corrugated sheets perpendicularly to the longitudinal section of the corrugated sheets, wherein on the at least one rod before the first corrugated sheet of the packing element and/or after the last corrugated sheet of the packing element at least one mounting clip is provided for fixing the corrugated sheets on the rod, wherein the mounting clip comprises a central part forming a coupling portion for coupling the mounting clip to the rod and two opposing lateral parts forming a clamping portion for a clamping engagement with the corrugated sheet, wherein the lateral parts are connected with the central part and angled with respect to the central part.

This solution bases on the finding that by using such a mounting clip instead of a washer and nut, as in the prior art, not only the mechanical stability of the packing element can be increased even in the case of a small number of points of intersections between adjacent corrugated sheets and in the case that the corrugated sheets are comparably thick, but that in particular also a falling off of the first and last corrugated sheets from the packing element can be reliably avoided, even when the packing element is exposed to extreme mechanical challenges, like rude handling, transportation and vibration. This is due to the fact that a mounting clip comprising a central part forming a coupling portion for coupling the mounting clip to the rod and two opposing lateral parts forming a clamping portion for a clamping engagement with the corrugated sheet, tightly fixes the first and last corrugated sheet of the packing element to the rods, wherein the lateral parts avoid—even in case of severe mechanical force—that the corrugated sheets can slip with their slits over the mounting clip, because the lateral parts of the mounting clip extensively touch either i) with a large area of contact between the lateral parts of the mounting clip and the respective corrugated sheet or ii) by covering and thus fixing a large area of the respective corrugated sheet with the lateral parts of the mounting clip even if there is only a small direct contact area between the mounting clip and the respective corrugated sheet. Both aforementioned alternatives i) and ii) reliably fix the respective corrugated sheets to the rods. Moreover, since the edge or the surface of the lateral parts of the mounting clip is also oriented preferably parallel to the corrugation, a sufficient friction between the mounting clip and the corrugated sheets as well as a mechanically stable set-up is achieved, so that the corrugated sheets are prevented from rotating around the rod. Even hard pulling and shocks—such as a result of a falling off from the packing element—will not free the corrugated sheets from the packing element according to the present invention. In addition, the aforementioned mounting clip stabilizes the first and the last corrugated sheet of the packing element against tilting and twisting so that the packing element has an increased rigidity.

In advantage to a washer, even if it has a rectangular shape, the mounting clip of the present invention exactly aligns to the contour of the corrugated sheet, whereas a washer tends to twist or arrange in an oblique orientation.

The aforementioned effects and advantages are in particular achieved, when a mounting clip is provided on each of the at least one rod before the first corrugated sheet of the packing element and a mounting clip is provided on each of the at least one rod after the last corrugated sheet of the packing element.

In a further development of the idea of the present invention, the central part and the two lateral parts of the at least one mounting clip of the packing element in accordance with the present invention are formed so that at least a part of the surface of the lateral parts of the at least one mounting clip fits to the contour of the corrugation of the corrugated sheets of the packing element. It is in particular preferred that at least a part of the two lateral parts of the at least one mounting clip of the packing element in accordance with the present invention is formed so that its surface fits to the contour of the troughs of the corrugated sheets. This allows that the mounting clip tightly fixes with its clamping portion the first and last corrugated sheet of the packing element to the corresponding rod, wherein the lateral parts avoid that the slits of these corrugates sheets can slip over the mounting clip even in case of severe mechanical force, because the lateral parts extensively touch with a large area of contact and fix the respective corrugated sheets to the respective rod. It is particularly preferred in this embodiment that the two lateral parts of the at least one mounting clip have each a surface area of at least 1 $cm^2$ and more preferably of at least 2 $cm^2$, wherein the two lateral parts of the at least one mounting clip are adapted to fit to the contour of the troughs of the corrugated sheets of the packing element.

Preferably, the lateral parts of the at least one mounting clip of the packing element are angled with respect to the central part such that the at least one mounting clip has a U-shaped cross section with a closed side formed by the surface of the central part and the surfaces of the lateral parts being opposite to the opening of the U-shape and with an open side formed by the opposite surface of the central part and the opposite surfaces of the lateral parts forming the opening of the U-shape.

In accordance with a particularly preferred embodiment of the present invention, the at least one mounting clip is provided in the packing element on the at least one rod so that the closed side of the U-shaped mounting clip touches a trough of the first and/or last corrugated sheet of the packing element. This allows that all or at least a major part of the surfaces of the lateral parts of the mounting clip contact and fix the respective corrugated sheets to the rods allowing to reliably avoid that the corrugates sheets slip over the mounting clip even in the case of severe mechanical impact. In addition, this allows to significantly stabilize the first and the last corrugated sheet of the packing element against tilting so that the packing element has an increased rigidity.

In accordance with a further and even more preferred embodiment of the present invention, the at least one mounting clip is provided in the packing element on the at least one rod so that the open side of the U-shaped mounting clip touches a trough of the first and/or last corrugated sheet of the packing element. In other words, in this embodiment the top edges of the two lateral parts of the at least one mounting clip touch a trough of the first and/or last corrugated sheet of the packing element. This allows that the lateral parts of the mounting clip fix a quite large area of the respective corrugated sheet to the rods, but that nevertheless only a comparable small direct contact area between the clamping portion of the mounting clip and the surface of the respective corrugated sheet exists. This leads to a further minimization of a possible fouling during the operation of the packing element. Nevertheless, this embodiment allows to reliably avoid that the corrugates sheets slip over the mounting clip even in the case of severe mechanical impact and to significantly stabilize the first and the last corrugated sheet of the packing element against tilting so that the packing element has an increased rigidity.

In a further development of the idea of the present invention, it is proposed that each of the lateral parts of the at least one mounting clip of the packing element according to the present invention is angled with respect to the central part at an angle of at least 30° and preferably at an angle of 30 to 60°. It is particularly preferred that both lateral parts of the at least one mounting clip are angled with respect to the central part at the same angle. This leads to an axially symmetrical U-shaped mounting clip allowing to perfectly fit to the approximately sinusoidal contour of the trough of the corresponding corrugated sheet of the packing element and to fix a quite large area of the respective corrugated sheet to the rods.

Moreover, it is preferred that the central part of the at least one mounting clip has an elongate rectangular shape, wherein each of the lateral parts of the at least one mounting clip extends over at least a part of an opposite long side of the elongate rectangularly shaped central part.

In the aforementioned embodiment, each of the lateral parts of the at least one mounting clip preferably extends over at least 50%, more preferably over at least 75%, even more preferably over at least 90%, still more preferably over at least 95% and most preferably over at least 100% of the length of an opposite long side of the rectangular shaped central part of the at least one mounting clip of the packing element. Preferably, the whole length of the central part of the mounting clip is covered by the lateral parts forming the clamping portion allowing to exploit the length width of the mounting clip for fixing the corrugated sheet to the rod of the packing element. Moreover, due to the large contact area between the central and lateral parts of the mounting clip, the respective mounting clip is mechanically very stable. Alternatively and even more preferably, the lateral parts forming the clamping portion extend over both sides of the whole length of the central part of the mounting clip, in order to safe material for the mounting clip. It is preferred in this embodiment that each of the lateral parts of the at least one mounting clip extends over more than 100%, more preferably over 200 to 400% and most preferably over 150 to 250%, such as about 200% of the length of an opposite long side of the rectangular shaped central part of the at least one mounting clip of the packing element.

The aforementioned effects and advantages are in particular obtained, when the central part and each of the lateral parts of the at least one mounting clip have an elongate rectangular shape, wherein each of the lateral parts has the same length as the central part, and wherein each of the lateral parts extends over the length of an opposite long side of the rectangular shaped central part.

In accordance with a further preferred embodiment of the present invention, each of the lateral parts of the at least one mounting clip of the packing element has an elongate rectangular shape, wherein the width of each of the lateral parts preferably amounts to 10 to 60%, preferably to 20 to 50% and more preferably to 25 to 35% of the width of the central part.

In a further development of the idea of the present invention, it is proposed that each of the lateral parts of the at least one mounting clip of the packing element has the same width. This leads to an axially symmetrical U-shaped mounting clip allowing to perfectly fit to the sinusoidal contour of the trough of the corresponding corrugated sheet of the packing element and to fix a quite large area of the respective corrugated sheet to the respective rod.

In order to allow the at least one mounting clip to have a required high mechanical strength and in particular high flexural strength, it is proposed in accordance with a further embodiment of the present invention that the at least one mounting clip of the packing element is formed from a metal sheet, with the lateral parts being bent with respect to the central part, wherein the metal sheet has preferably a thickness of 0.5 to 3 mm and more preferably of 1 to 2 mm.

The central part of the at least one mounting clip may comprise a through-hole, through which the at least one rod extends.

In order to fix the at least one mounting clip on the at least one rod at the corresponding corrugated sheet of the packing element, it is proposed to arrange at least one nut possibly combined with a washer and preferably an additional counter nut both on the side of the at least one mounting clip being opposite to the side facing the corrugated sheet.

In principle, the present invention is not limited concerning the number of corrugated sheets in the packing element. However, it is preferred that the packing element has a weight allowing it to be carried by a person or by two persons. In view of this, it is preferred that the packing element comprises 5 to 10 and more preferably 6 to 9 corrugated sheets.

Preferably, each corrugated sheet of the packing element has the same corrugation pattern and the same corrugation contour.

As set out in detail above, the packing element of the present patent application has—due to the specific mounting clip—an improved mechanical stability even in the case that the packing element has only a small number of points of intersections between adjacent corrugated sheets. Accordingly, the packing element of the present patent application may have in particular a small number of points of intersections between adjacent corrugated sheets and thus respective low angles between the corrugations and the vertical direction, i.e. the gas flow direction of the packing element. As mentioned above, the number of points of intersections between adjacent corrugated sheets depends on the angle of inclination of the cross-channels, on the height of the packing element and on the dimensions of the cross-channels. More specifically, the number of points of intersections between adjacent corrugated sheets increases with an increment of the angle between the corrugations and the vertical direction, if the angle is within a range of 1 to 45° or even of 5 to 45°, whereas the number of points of intersections between adjacent corrugated sheets decreases with an increment of the angle between the corrugations and the vertical direction, if the angle is higher than 45°. However, if the angle is higher than 45° the pressure drop of the packing element is so high that such an angle is usually not practicable. Moreover, the number of points of intersections between adjacent corrugated sheets decreases with decreasing height of the packing element. Thus, the number of points of intersections between adjacent corrugated sheets is in particular low, if the angle between the corrugations and the vertical direction is lower than 45° and if the height of the packing element is quite small.

Preferably, in the packing element according to the present invention the angle between any peak and any trough of any corrugated sheet with respect to the vertical direction is 20 to less than 45°, more preferably 25 to 40°, even more preferably 30 to 40° and most preferably 34 to 39°, such as for example 36°. This leads in particular together with a comparably small height of the packing element to a decreased number of points of intersection between adjacent corrugated sheets and thus reduces during the operation of the packing element a fouling as well as coking at these places of the corrugated sheets.

Accordingly, it is also preferred that each of two adjacent corrugated sheets of the packing element in accordance with the present invention has a number of points of intersection between 10,000 and 250 $m^{-3}$, preferably between 7,500 and 2,500 $m^{-3}$ and more preferably between 6,000 and 4,000 $m^{-3}$. This reduces during the operation of the packing element a fouling as well as a coking at the places at the points of intersection of the corrugated sheets of the packing element.

As set out in detail above, the packing element of the present patent application has—due to the specific mounting clip—an improved mechanical stability even in the case that the corrugated sheets of the packing element are comparably thick so that they cannot be provided with drill holes being exactly adapted to the dimensions of the rod, but have to be provided with large slits, in order to allow them to be arranged onto a rod. In particular, the present invention allows using corrugated sheets being made of metal and having a thickness of 0.5 to 3 mm and more preferably of 0.5 to 2.0 mm. Such thick corrugated sheets cannot be tightly fixed together with a washer and a nut, as used in the prior art, without being flabby and with the danger that the first and last corrugated sheets fall off the packing element, when exposed to extreme mechanical challenges, like rude handling, transportation and vibration. This is particularly true if the height of the packing element is small and so the number of points of intersection between adjacent corrugated sheets.

Particularly in the aforementioned embodiment, it is preferred that each of the corrugated sheets of the packing element have at least one slit adapted to accommodate the at least one rod. This is especially preferred for comparable thick corrugated sheets, because they usually cannot be processed by incorporating a drill hole. Instead, the slits are provided before corrugating the sheets.

In principle, the present invention is not particularly restricted concerning the dimensions of the corrugated sheets. However, good results are particularly obtained, if the layer height of the corrugated sheet is 30 to 100 mm and more preferably of 50 to 80 mm. The layer height of the corrugated sheet is the distance between a plane extending tangentially to the outermost point of a corrugation peak of the corrugated sheet and a parallel plane extending tangentially to the outermost point of an adjacent corrugation trough.

The plane, which is parallel to the both aforementioned planes and which extends at half distance between the both aforementioned planes is the longitudinal section of the corrugated sheet in the sense of the present patent application.

Likewise, it is preferred that the width of the corrugation pattern of the corrugated sheet or corrugation step, respectively, is 60 to 200 mm and more preferably of 100 to 160 mm. The width of the corrugation pattern of the corrugated sheet is the distance between the outermost points of two adjacent corrugation troughs.

In accordance with a further particular preferred embodiment of the present invention, the specific surface area of the packing element amounts to 30 to 120 $m^2/m^3$ and more preferably to 35 to 90 $m^2/m^3$.

The present invention is also not particularly restricted concerning the dimensions of the packing element. However, good results are in particular obtained, when the packing element has a height of 100 to 350 mm.

It is further preferred that the packing element comprises in the second third of the height of the element more than one rod, namely preferably more than 3 rods, such as 5 to 12 rods, which are arranged in a row and which are fixed to the first and last corrugated sheet with each a mounting clip. Preferably, the distance between two adjacent rods in the row is 100 mm to 300 mm and more preferably 150 mm to 250 mm.

Moreover, it is preferred that the packing element has a length of 1 to 2 m.

Likewise, it is preferred that the packing element has a depth of 300 to 500 mm. The depth of the packing element is the distance between the outermost point of the first corrugated sheet and the outermost point of the last corrugated sheet of the packing element.

In order to achieve a required mechanical stability, it is preferred in a further development of the idea of the present invention that the packing element comprises more than 3 rods, such as 5 to 12 rods, wherein a mounting clip is provided on each rod before the first corrugated sheet of the packing element and a mounting clip is provided on each rod after the last corrugated sheet of the packing element. Preferably, all rods are threaded so as to fit with at least one nut and an additional counter nut, which are preferably mounted after the mounting clip.

Preferably, each of the corrugated sheets has the same number of slits adapted to accommodate the rods.

A further aspect of the present invention is a structured packing comprising a plurality of packing elements according to any of the preceding claims, wherein all packing elements are arranged in succession in a designed direction.

Preferably, the coupling portion of the mounting clip is provided with a through-hole to accommodate the rod.

A still further aspect of the present invention is a mounting clip comprising a central part forming a coupling portion for coupling the mounting clip to a fastening element, such as a threaded rod, and two opposing lateral parts forming a clamping portion for a clamping engagement with an object to be secured, wherein the lateral parts are connected with the central part and angled with respect to the central part such that the mounting clip has a U-shaped cross section.

Specific embodiments in accordance with the present invention are subsequently described with reference to the appended drawings and by an example.

FIG. 1b is a top view of the mounting clip shown in FIG. 1a.

FIG. 2b is a sectional side view of a corrugated sheet of the packing element shown in FIG. 2a.

FIG. 2c is a top view of a corrugated sheet of the packing element shown in FIG. 2a.

Figure 1A:
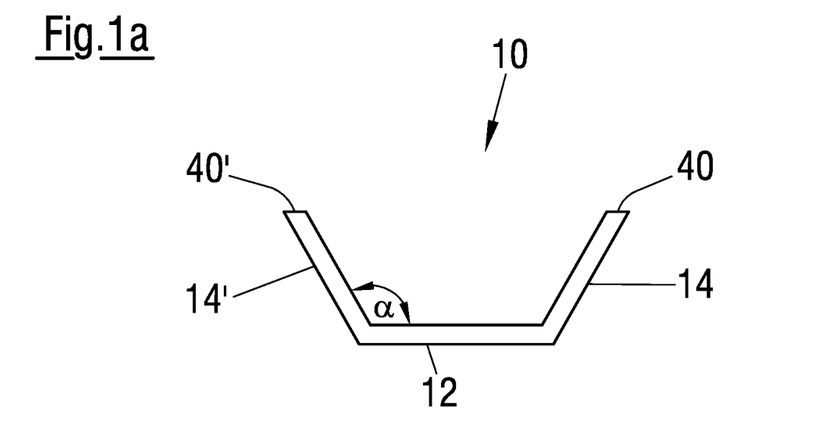
FIG. 1a is a sectional side view of a mounting clip for a packing element for a structured packing according to one embodiment of the present invention.
Figure 1B:
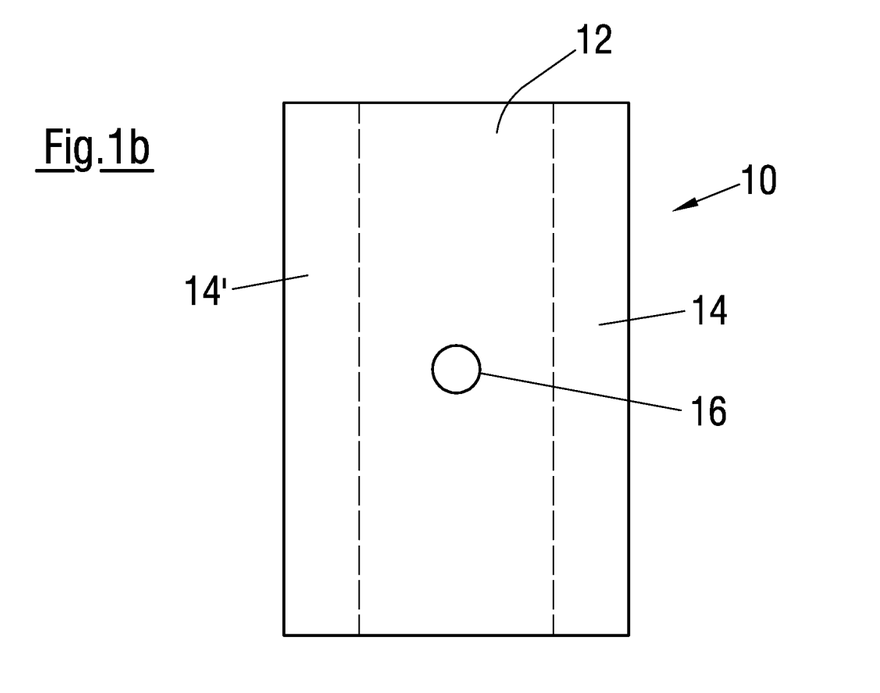

FIGS. 1a and 1b show a mounting clip 10 for a packing element for a structured packing according to one embodiment of the present invention. The respective mounting clip 10 comprises a central part 12 forming a coupling portion for coupling the mounting clip 10 to the rod of a packing element and two opposing lateral parts 14, 14' forming a clamping portion for a clamping engagement with the corrugated sheet of a packing element, wherein the lateral parts 14, 14' are connected with the central part 12 and angled with respect to the central part 12 of the mounting clip 10.

Both, the central part 12 and each of the lateral parts 14, 14' of the mounting clip 10 have an elongate rectangular shape, wherein each of the lateral parts 14, 14' has the same length as the central part 12, and wherein each of the lateral parts 14, 14' extends over the length of an opposite long side of the rectangular shaped central part 12 of the mounting clip 10. Both lateral parts 14, 14' have the same width and the width of each of the lateral parts 14, 14' amounts to about 35% of that of the central part 12 of the mounting clip 10. As shown especially in FIG. 1a, the lateral parts 14, 14' of the mounting clip 10 are angled with respect to the central part 12 such that the mounting clip 10 has a U-shaped cross section, wherein each of the lateral parts 14, 14' of the mounting clip 10 is angled with respect to the central part 12 at an angle α of about 40°.

A through-hole 16 is located at the center of the central part 12 of the mounting clip 10, wherein the through-hole 16 is adapted concerning its dimensions to the corresponding rod. The central part 12 and each of the lateral parts 14, 14' of the mounting clip 10 are made of stainless steel and each of these parts has a thickness of about 1.5 mm.

Figure 2A:
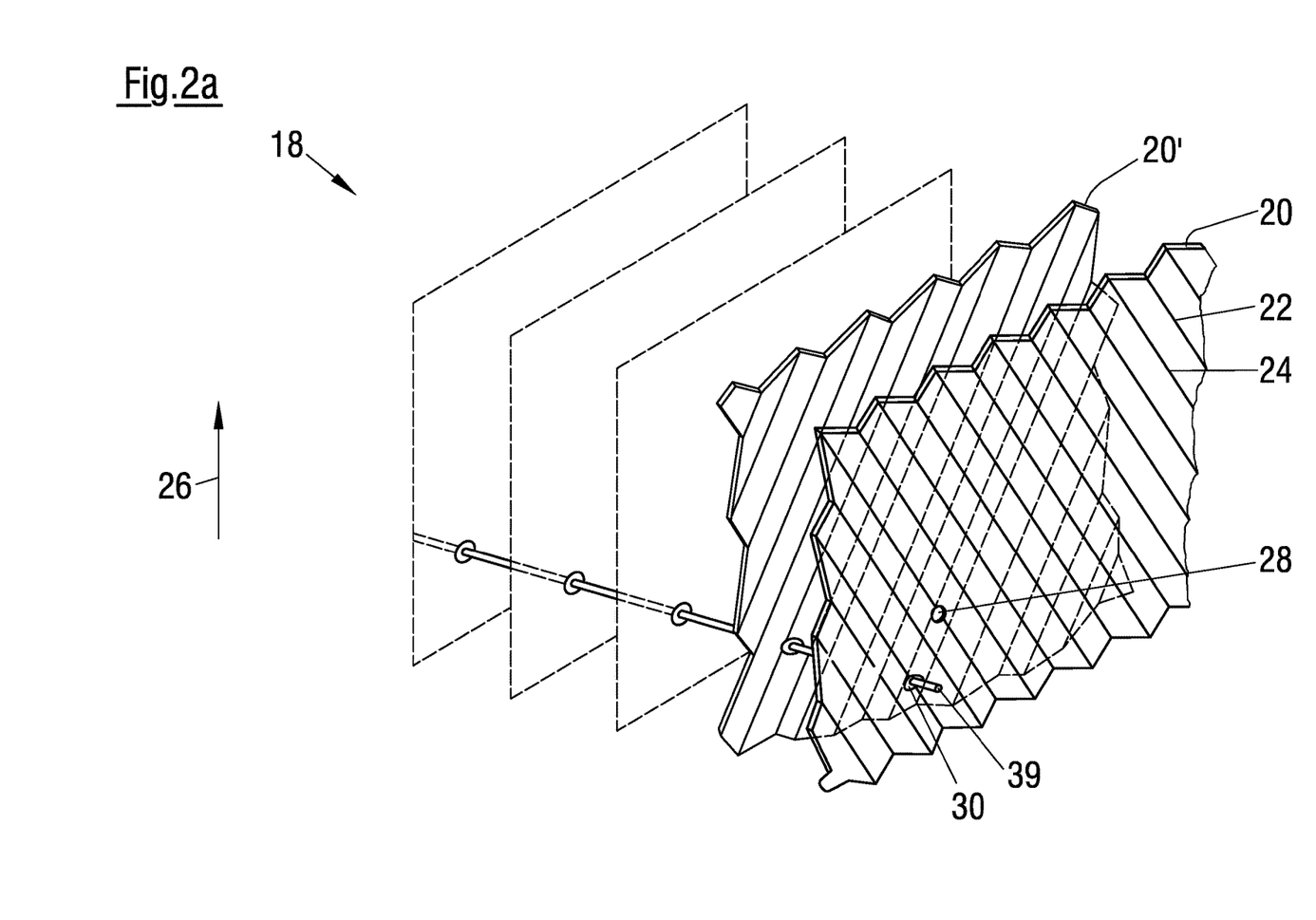
FIG. 2a is a schematic perspective/exploded view of the packing element for a structured packing according to one embodiment of the present invention.
Figure 2B:
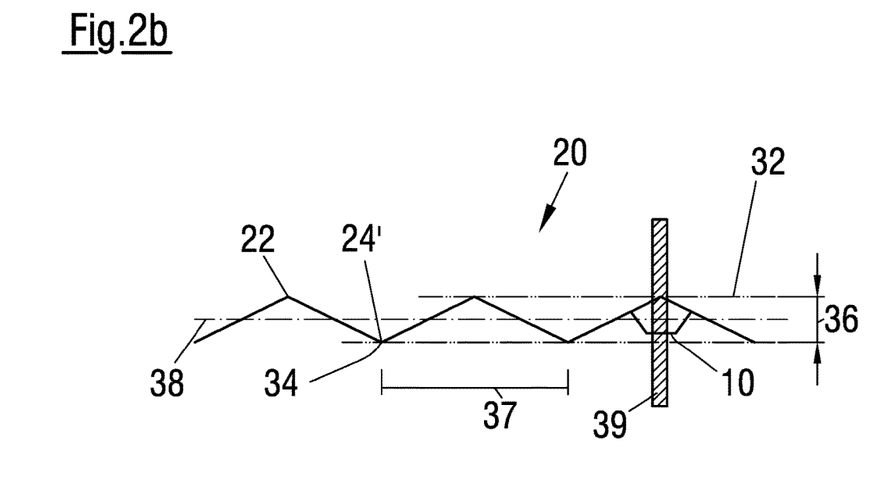
Figure 2C:
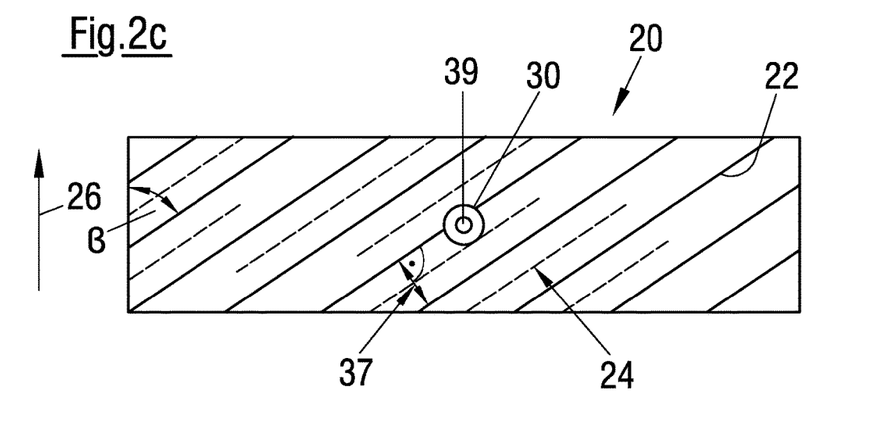

FIGS. 2a to 2c show a packing element 18 for a structured packing according to one embodiment of the present invention. The packing element 18 includes several corrugated sheets 20, 20', wherein each corrugated sheet 20, 20' of the packing element 18 has the same corrugation pattern and the same corrugation contour. More specifically, each of the corrugated sheets 20, 20' comprises a plurality of alternately oriented peaks 22 and troughs 24. As shown in particular in the outermost right corrugated sheet 20 in FIG. 2a, this means that each corrugated sheet 20, 20' comprises a series of alternating peaks and troughs, which are oriented in alternating up and down fashion with respect to the horizontal direction, i.e. the direction perpendicular to the vertical direction 26. Adjacent corrugated sheets 20, 20' are oriented such that the corrugations 22, 24 of the adjacent corrugated sheets 20, 20' intersect in crisscross fashion with the corrugations 22, 24 of the corrugated sheets 20, 20' extending obliquely relative to the vertical direction 26. For a better illustration of that, the peaks of the second corrugated sheet 20' shown in FIG. 2a are shown in broken line in that part of the corrugated sheet 20', which is covered by the first corrugated sheet 20. Each corrugated sheet 20, 20' contacts each of the adjacent corrugated sheets 20, 20' at points of intersection 28 between the corrugations 22, 24 of the corrugated sheet 20, 20' and those of the adjacent corrugated sheets 20, 20'.

In the shown embodiment, as particularly shown in FIG. 2b the distance between the plane 32 extending tangentially to the outermost point of the corrugation peak 22 of the corrugated sheet 20 and the parallel plane 34 extending tangentially to the outermost point of the adjacent corrugation trough 24, i.e. the layer height 36 of the corrugated sheet 20, is about 70 mm. Moreover, the distance between the outermost points of two adjacent corrugation troughs 24, i.e. the width 37 of the corrugation pattern of the corrugated sheet 20, 20' or corrugation step, respectively, is about 10 mm.

The plane 38 shown in FIG. 2b, which is parallel to the both planes 32, 34 and which extends at half distance between the both aforementioned planes 32, 34, is the longitudinal section of the corrugated sheet 20.

As particularly shown in FIG. 2c, the angle β between any peak 22 and any trough 24 of any corrugated sheet 20, 20' with respect to the vertical direction 26 amounts to about 35°, which leads to a packing element 18 having a comparably low number of points of intersection 28 between adjacent corrugated sheets 20, 20', namely about 650 points of intersection per cubic meter. This reduces during the operation of the packing element 18 a fouling as well as a coking at the places at the points of intersection 28 of the corrugated sheets 20, 20' of the packing element 18. Moreover, the corrugated sheets 20, 20' of the packing element 18 are comparably thick, namely the thickness amounts to about 0.5 mm. In order to fix the corrugated sheets 20, 20' of the packing element 18 together and to provide mechanical stability to the packing element 18, the corrugated sheets 20, 20' are arranged on several rods 39. On account of this thickness, the corrugated sheets 20, 20' of the packing element 18 cannot be provided with drill holes after having been corrugated, but have been provided with comparably large slits 30, in order to allow them to be arranged onto the rods 39. The slits are typically punched into the metal sheet before the corrugation process. Another option would be cutting by means of a laser cutting machine. As particularly show in FIG. 2b, the mounting clip 10 as described above is provided on the rod 39 before the first corrugated sheet 20 of the packing element 18 and also after the last corrugated sheet of the packing element 18 (not shown) for fixing the corrugated sheets 20, 20' on the rod 39.

Figure 3:
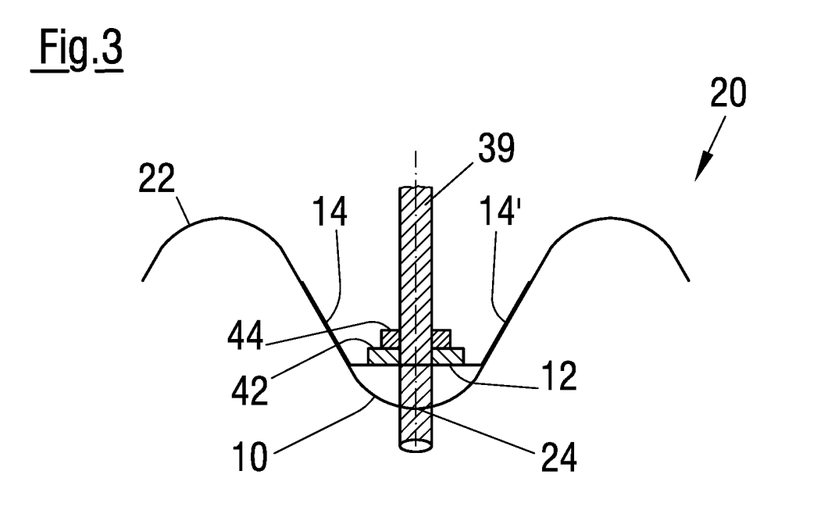
FIG. 3 is a sectional view of a part of a corrugated sheet arranged on a rod and fixed with it by means of a mounting clip according to a first embodiment of the present invention.

As shown in FIG. 3, the mounting clip 10 is according to a particular preferred embodiment of the present invention provided on the rod 39 with its closed side touching a trough 24 of a corrugated sheet 20 of the packing element 18. This allows that all or at least a major part of the surfaces of the lateral parts 14, 14' of the mounting clip 10 contact and fix the respective corrugated sheets 20, 20' to the rods 39 allowing to reliably avoid that the corrugates sheets 20, 20' slip over the mounting clip 10 even in the case of severe mechanical impact. In addition, this allows to significantly stabilize the first and the last corrugated sheet of the packing element 18 against tilting so that the packing element has an increased rigidity.

Figure 4:
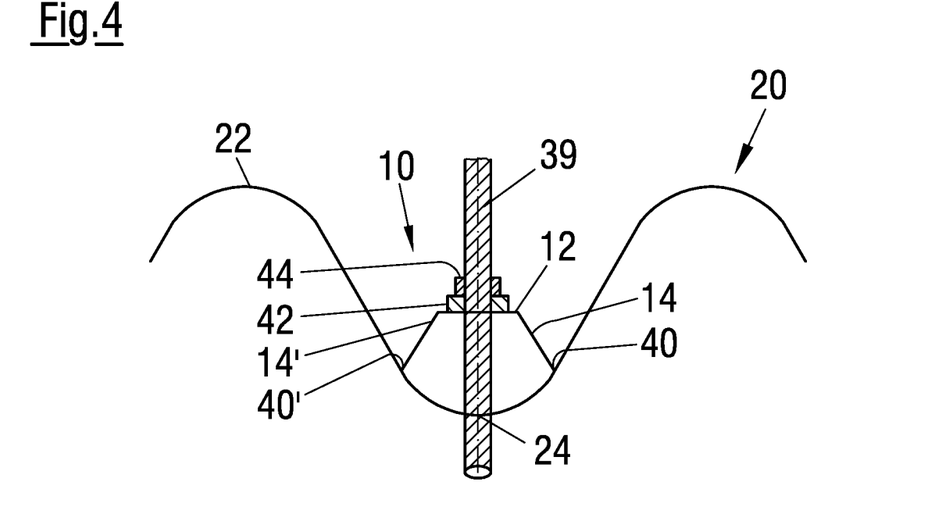
FIG. 4 is a sectional view of a part of a corrugated sheet arranged on a rod and fixed with it by means of a mounting clip according to a second embodiment of the present invention.

According to an even preferred alternative embodiment of the present patent application, which is shown in FIG. 4, the mounting clip 10 is provided on the rod 39 with its open side touching a trough 24 of a corrugated sheet 20 of the packing element 18. More specifically, in this embodiment the top edges 40, 40' of the two lateral parts 14, 14' of the mounting clip 10 touch a trough 24 of the first or last corrugated sheet of the packing element 18. This allows that the lateral parts 14, 14' of the mounting clip 10 fix a quite large area of the respective corrugated sheet 20, 20' to the rods 39, but that nevertheless only a comparable small direct contact area between the clamping portion of the mounting clip 10 and the surface of the respective corrugated sheet 20 exists. This leads to a further minimization of a possible fouling during the operation of the packing element. Nevertheless, this embodiment allows to reliably avoid that the corrugates sheets 20, 20' slip over the mounting clip 10 even in the case of severe mechanical impact and to significantly stabilize the first and the last corrugated sheet 20, 20' of the packing element 18 against tilting so that the packing element 18 has an increased rigidity.

As shown in FIGS. 3 and 4, downstream the mounting clip 10, i.e. on the side of the mounting clip being opposite to that of the trough 24, a nut 42 and counter nut 44 are arranged. These are also preferably provided in the embodiments shown in FIGS. 1, 2a, 2b and 2c (not shown).

The invention claimed is:

1. A packing element for a structured packing including at least two adjacent corrugated sheets, wherein each of the at least two adjacent corrugated sheets comprises a plurality of alternately oriented peaks and troughs, wherein adjacent corrugated sheets are oriented such that the corrugations of the adjacent corrugated sheets intersect in crisscross fashion with the corrugations of the corrugated sheets extending obliquely relative to the vertical direction, wherein each corrugated sheet contacts each of the adjacent corrugated sheets at points of intersection between the corrugations of the corrugated sheet and those of the adjacent corrugated sheets, wherein all of the at least two adjacent corrugated sheets are tied together by means of at least one rod, wherein the at least one rod penetrates the at least two adjacent corrugated sheets perpendicularly to the longitudinal section of the at least two adjacent corrugated sheets, further comprising at least one mounting clip that is provided on the at least one rod before the first corrugated sheet of the packing element and/or after the last corrugated sheet of the packing element for fixing the corrugated sheets on the rod, wherein the at least one mounting clip comprises a central part forming a coupling portion for coupling the at least one mounting clip to the rod and two opposing lateral parts forming a clamping portion for a clamping engagement with one of the at least two adjacent corrugated sheets, wherein the two opposing lateral parts are connected with the central part and angled with respect to the central part.

2. The packing element according to claim 1, wherein the central part and the two opposing lateral parts of the at least one mounting clip are formed so that at least a part of the surface of the two opposing lateral parts of the at least one mounting clip fits to the contour of the corrugation of the at least two adjacent corrugated sheets.

3. The packing element according to claim 1, wherein the two opposing lateral parts of the at least one mounting clip are angled with respect to the central part such that the at least one mounting clip has a U-shaped cross section.

4. The packing element according to claim 3, wherein the at least one mounting clip is provided on the at least one rod with its closed side touching a trough of the first and/or last corrugated sheet of the at least two adjacent corrugated sheets of the packing element.

5. The packing element according to claim 3, wherein the at least one mounting clip is provided on the at least one rod with its open side touching a trough of the first and/or last corrugated sheet of the at least two adjacent corrugated sheets of the packing element.

6. The packing element according to claim 1, wherein the central part of the at least one mounting clip has an elongate rectangular shape, and wherein each of the two opposing lateral parts of the at least one mounting clip extends over at least a part of an opposite long side of the elongate rectangular shaped central part.

7. The packing element according to claim 1, wherein the central part of the at least one mounting clip comprises a through-hole, through which the at least one rod extends.

8. The packing element according to claim 1, wherein the packing element comprises 5 to 10 corrugated sheets.

9. The packing element according to claim 8, wherein the packing element comprises 6 to 9 corrugated sheets.

10. The packing element according to claim 1, wherein the angle between any peak and any trough of any corrugated sheet with respect to the vertical direction is 20 to less than 45°.

11. The packing element according to claim 1, wherein the angle between any peak and any trough of any corrugated sheet with respect to the vertical direction is 34 to 39°.

12. The packing element according to claim 1, wherein each adjacent corrugated sheet is made of metal and has a thickness of 0.5 to 3 mm.

13. The packing element according to claim 1, wherein each adjacent corrugated sheet is made of metal and has a thickness of 0.5 to 2.0 mm.

14. The packing element according to claim 1, wherein a specific surface area of the packing element is 35 to 90 $m^2/m^3$.

15. The packing element according to claim 1, wherein the packing element has a height of 100 to 350 mm and comprises in a second third of a height of the packing element more than one rod arranged in a row and being fixed to the first and last corrugated sheet of the at least two adjacent corrugated sheets with each a mounting clip, wherein the distance between two rods in the row is 100 mm to 300 mm.

16. The packing element according to claim 15, wherein the distance between two rods in the row is 150 mm to 250 mm.

17. The packing element according to claim 1, wherein each of the at least two adjacent corrugated sheets has at least one slit adapted to accommodate the at least one rod.

18. The packing element according to claim 1, wherein the packing element comprises 1 to 10 rods, wherein a mounting clip is provided on each rod before the first corrugated sheet of the at least two adjacent corrugated sheets of the packing element and a mounting clip is provided on each rod after the last corrugated sheet of the packing element.

19. The packing element according to claim 18, comprising a plurality of packing elements and all of the packing elements of the plurality of packing elements are arranged in succession in a designed direction.

* * * * *